Feb. 26, 1957 R. L. SARGISSON ET AL 2,783,313

MOUNTING FOR TELEPHONE HANDSETS

Filed April 8, 1955 5 Sheets-Sheet 1

*INVENTORS*

ROBERT L. SARGISSON

FREDRIC E. WOOD

*BY* McWatters Owen

ATTY.

MOUNTING FOR TELEPHONE HANDSETS

Filed April 8, 1955 5 Sheets-Sheet 2

INVENTORS
ROBERT L. SARGISSON
FREDRIC E. WOOD
BY *[signature]*
ATTY.

Feb. 26, 1957 R. L. SARGISSON ET AL 2,783,313

MOUNTING FOR TELEPHONE HANDSETS

Filed April 8, 1955 5 Sheets-Sheet 3

INVENTORS
ROBERT L. SARGISSON
FREDRIC E. WOOD
BY Wm. Walter Owen
ATTY.

Feb. 26, 1957 R. L. SARGISSON ET AL 2,783,313

MOUNTING FOR TELEPHONE HANDSETS

Filed April 8, 1955 5 Sheets-Sheet 4

INVENTORS
ROBERT L. SARGISSON
FREDRIC E. WOOD
BY
Mc Walter Owen
ATTY.

Feb. 26, 1957 R. L. SARGISSON ET AL 2,783,313

MOUNTING FOR TELEPHONE HANDSETS

Filed April 8, 1955 5 Sheets-Sheet 5

INVENTORS
ROBERT L. SARGISSON
FREDRIC E. WOOD
BY Wm. Walter Owen.
ATTY.

United States Patent Office 2,783,313

Patented Feb. 26, 1957

2,783,313

MOUNTING FOR TELEPHONE HANDSETS

Robert L. Sargisson, Berwyn, and Fredric E. Wood, McHenry, Ill., assignors to Automatic Electric Laboratories, Inc., Chicago, Ill., a corporation of Delaware Application April 8, 1955, Serial No. 500,063

8 Claims. (Cl. 179—146)

This invention relates to mountings of acoustic devices and more particularly to mountings for handset telephones adapted to be supported on a vertical surface.

One object of the invention is to provide a mounting unit for a handset which will enable easy removal of the handset from a locked position by a user thereof by an unlocking means, while preventing accidental removal therefrom under extraordinary adverse conditions.

Another object of the invention is to provide a locking or latching device for a handset telephone which will maintain the handset in position on the mounting under severe conditions such as encountered at battle stations or in gun turrets of fighting units in actual combat.

It is an object of the invention to provide a locking device and mounting unit of the type described which is extremely rugged in construction and which embodies a new and improved arrangement for locking and unlocking the handset for facilitating the replacing or removing of the telephone handset from the mounting unit.

One feature of the invention is the novel arrangement of the bowed spring mounting and the locking means therefor.

The foregoing objects and features thereof will be described hereinafter with references to the accompanying drawings in which.

Figure 1:
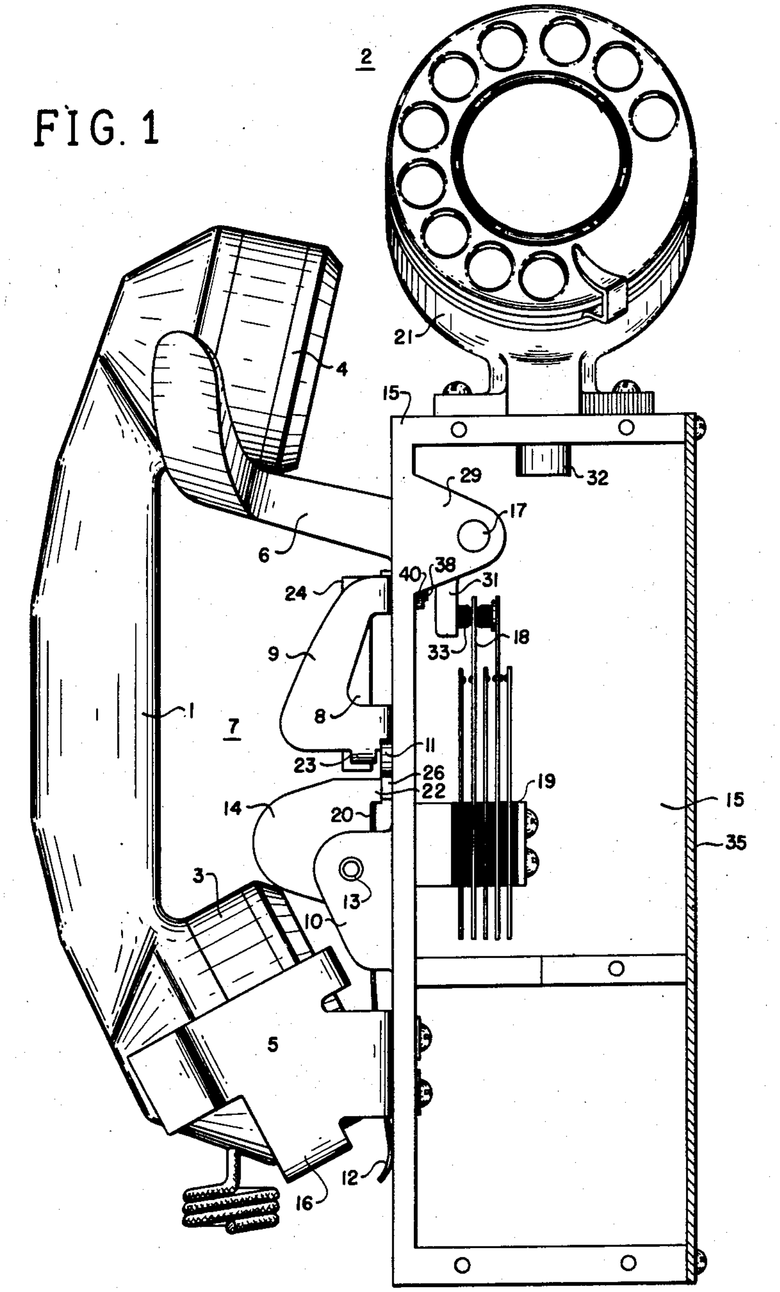
Fig. 1 is a front view of the mounting unit with the telephone handset and the locking device in its locked position, and an outer covering plate omitted to more fully disclose the mounted equipment within the interior of the mounting unit.

Referring now to the drawings, there is shown a mounting unit or support illustrative of this invention, for supporting a telephone handset, which mounting unit comprises a frame 15 having rectangular shaped sides preferably made of brass. The handset used may be of the type disclosed in the Herbert F. Obergfell Patent No. 2,428,091, issued September 30, 1947, containing a receiver 4 and transmitter 3 at opposite ends of the handle 1.

Figure 6:
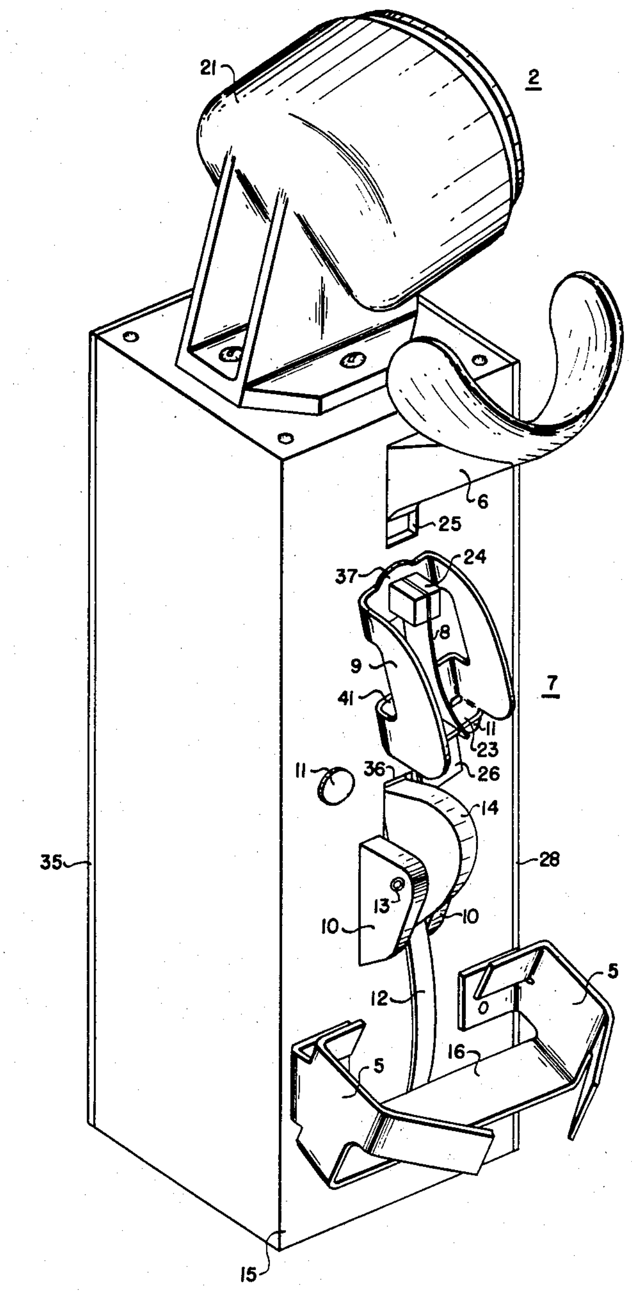
Fig. 6 is a perspective side view taken from the left and back of Fig. 1 showing the mounting unit with the locking device in its unlocked or unlatched position.

The frame 15 is enclosed at two sides namely the left and rear sides, and has openings on two sides. The two enclosed sides are moulded as part of the frame 15 (Fig. 6). The front side (Fig. 1), and the right side (Fig. 3), are the two sides having openings for allowing manual accessibility to the equipment mounted within the frame 15. The front side has a front plate 28 (Fig. 3) covering the front opening and a similar side plate 35 (Fig. 1) covers the side opening to completely enclose all the sides when desired. The plates 28 and 35 respectively, have a plurality of holes therethrough corresponding with threaded holes in the frame 15 to fasten the plates 28, and 35 over the openings in the frame 15 by means of screws.

Figure 2:
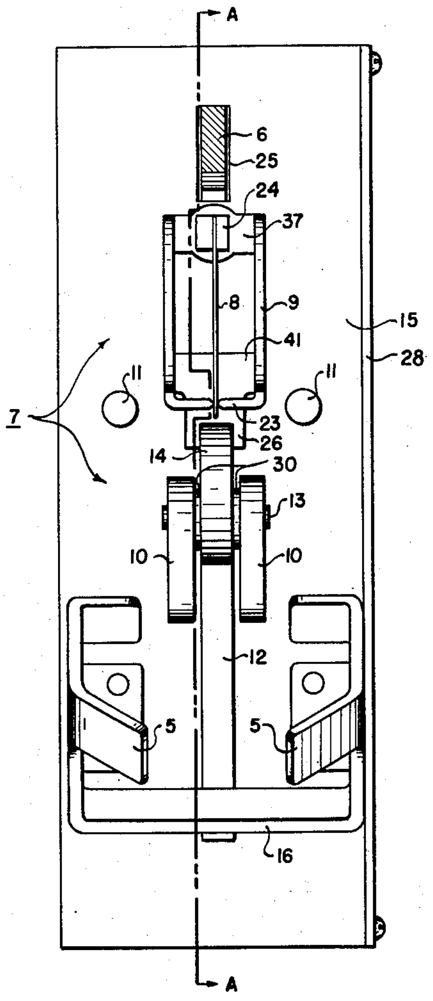
Fig. 2 is a side view taken from the left of Fig. 1, showing the locking device in a locked position and to clearly show the component parts of the locking device by omitting the handset telephone.

Figs. 2 and 6 show a cup shaped transmitter receptacle 5 near the bottom of the left side face of the frame 15. The transmitter receptacle has feet (Fig. 1) containing a plurality of threaded holes corresponding with holes in the left face of the frame 15 for fastening the transmitter receptacle 5 to the left face of the frame 15 by means of screws. The transmitter receptacle 5, is preferably made of brass in a shape to conform with the general contour of the transmitter 3 of the telephone handset. At each end of the feet the transmitter receptacle 5 extends straight outward from the left side of the frame 15 and the ends of the receptacle 5 bend angularly inward toward each other allowing enough gap between the bent ends for a portion of the transmittter 3, as shown in Fig. 1. Another bent portion, member 16 extends horizontally across and connects both sides of the receptacle 5. The member 16 is for the purpose of supporting the transmitter 3 in a vertical position as shown in Fig. 1.

The receiver receptacle 6 has a double curving projection conforming with a portion of the contour of the receiver 4 for supporting the receiver 4 and the telephone handset in a vertical position as shown in Fig. 1.

Figure 3:
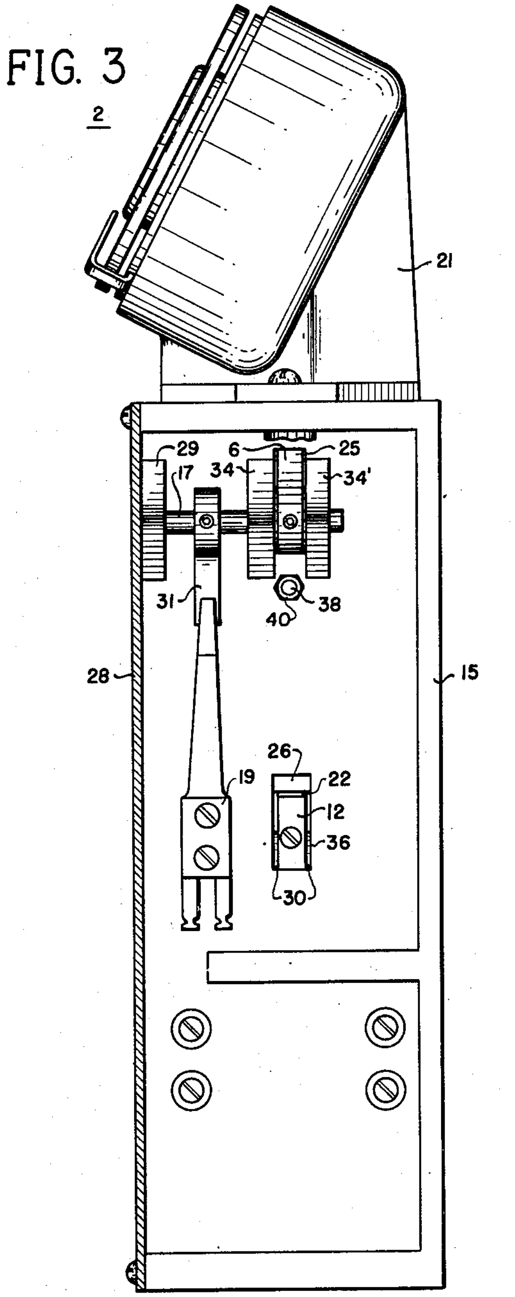
Fig. 3 is a side view taken from the right of Fig. 1, and having an outer covering plate removed to more fully disclose the interior and mounted equipment within the mounting unit.

Shown in Fig. 3 projecting from the inner face of the left side of frame 15 and moulded as part of the frame 15 are three mounting brackets 29, 34 and 34', having aligned holes which act as bearings for a rod 17 which extends through the holes in the three brackets. Mounted on the rod 17 between brackets 29 and 34 and rigidly secured by a set screw as shown, is a lever arm 31. The mounting brackets 34 and 34' are shown on opposite sides of a slot 25. One end of the receiver receptacle 6 projects through the slot 25, and is also mounted on the rod 17 and rigidly secured by a set screw as shown. The receiver receptacle 6 and the lever arm 31 are now rigid with, and in a position to be rotated with the rod 17. The rod holders 34 and 34' are on opposite sides of the receiver receptacle 6 to prevent horizontal displacement of the rod 17 and the receiver receptacle 6.

Shown in Fig. 3, the lever arm 31 has a downward projection containing a non-metallic bushing 33 mounted thereon for a purpose to be described in the ensuing disclosure.

Mounted on the left side of frame 15 between the receptacles 5 and 6 is a locking device generally designated as 7 for locking the telephone handset in a vertical position. This locking device comprises a pair of bearing supports 10 (Fig. 2) moulded with and extending outward from the left side of the frame 15 and having aligned circular holes therethrough. The inner surfaces of the bearing supports 10 are spaced on opposite sides of an opening 36 (Fig. 2). A cam 14 (Figs. 2 and 6) is pivotally mounted between the bearing supports 10. The outer surface of cam 14 has a curved contour and the opposite face has a flat edge 20 containing a projection 22.

Near the lower corner of cam 14 is a circular hole through the flat surfaces of the cam 14 corresponding with circular holes through the bearing supports 10. A pair of washers 30 (Figs. 2, 4 and 5) are placed on both sides of the cam 14 between the holes in the bearing supports 10 and the cam 14, and a pin 13 is inserted therethrough. The pin 13 is fastened in the circular holes of the bearing supports 10 to allow the cam 14 to rotate on the pin 13. The washers 30 allow the cam 14 to rotate easily about the pin 13 by preventing friction between the cam 14 and the bearing supports 10.

Figure 4:
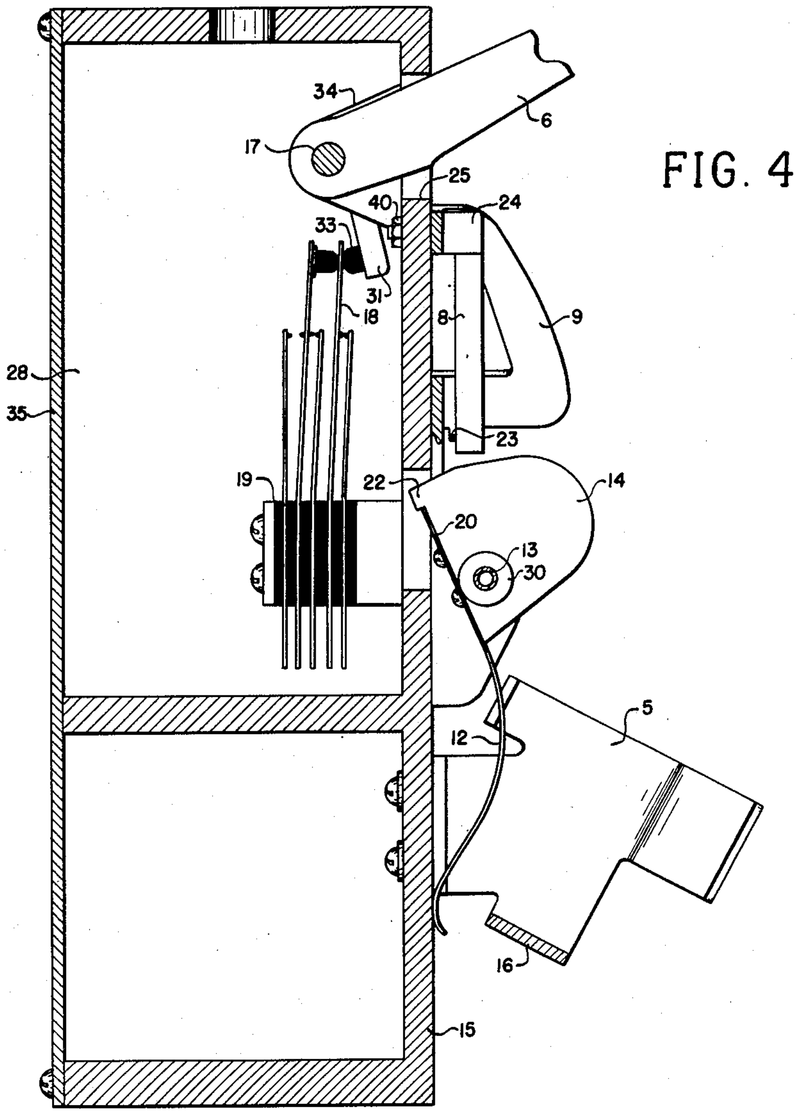
Fig. 4 is a sectional view taken from the left along line A—A of Fig. 2 to provide a clear view of a portion of the locking device in an unlocked position, and disclosing more specifically the bowed flat spring.
Figure 5:
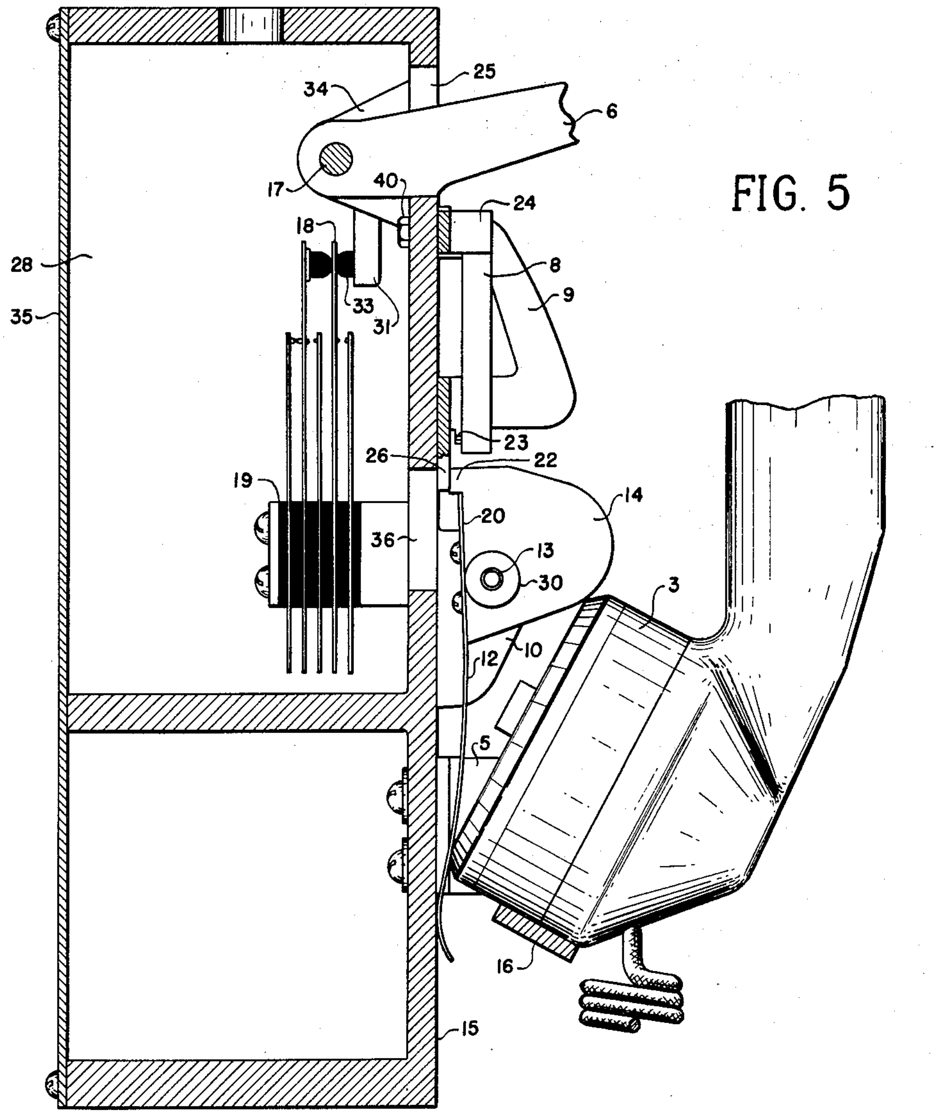
Fig. 5 is also a sectional view taken from the left along line A—A of Fig. 2 and providing a clear side view of a portion of the locking device in a locked position including a cutaway view of the handset to disclose the transmitter's cooperation with the flat type bowed spring.

The flat edge 20 of the cam 14 has one end of a flat type leaf or bow spring 12 mounted thereon, by means of a pair of screws through holes in the spring 12 and threaded holes in the flat edge 20 (Figs. 4 and 5). The flat leaf spring 12 extends from the flat edge 20 through the gap between the pair of bearing supports 10, over the feet of the transmitter receptacle 5 and curves at its end (Fig. 1). The purpose of the leaf spring 12 will be described in the ensuing disclosure.

Shown directly below the receiver receptacle 6 and forming part of the locking device 7 in Figs. 1, 2 and 6, is a pair of vertical and parallel "C-shaped" finger presses 9 joined at one end by a horizontal strip 37 (Fig. 2) which has a flat rear surface flush with the left face of the frame 15. The other ends of the "C-shaped" finger presses 9 are joined by a second horizontal strip 41 which has a projection 26 extending downward a short distance. The rear surface of the strip 41 lies flush with the left face of the frame 15 (Fig. 1). The finger presses 9 also have horizontal extensions 23 adjacent strip 41 lying in a plane perpendicular to the left face of the frame 15. The extensions 23 bend toward each other allowing enough gap between the ends thereof for a vertical flat type spring 8 to extend therebetween. A rectangularly shaped spring holder 24 has a round projection extending through a hole in strip 37 with a shoulder abutting against frame 15, and also has a threaded stud 38 projecting from this shoulder through a hole in frame 15, and is rigidly fastened to the frame by a nut 40 screwed tightly against the rear surface of the frame 15. The nut 40 prevents the spring holder 24 with its threaded projection 30 from movement, and the round projection provides a bearing for the finger press 9 and its component extensions and projections. The spring holder 24 has a vertical slot cut out for rigidly mounting one end of the flat type spring 8. The flat type spring 8 extends downward from spring holder 24 a short distance through and beyond the gap provided by the horizontal extensions 23.

It will be noted that the finger press 9 and its component extensions and projections can be rotated on its bearing, and the spring holder 24 remains firmly in place by the nut 40. Therefore, spring holder 24 does not rotate when the finger press 9 is rotated. However, the other end of the flat type spring 8 engaged by the inner edges of the extensions 23 move with the pivotal movement of the finger press 9 and causes the spring 8 to bend and tension. Releasing the finger press 9 after pivoting the finger press 9 will cause the spring 8 to release its tension and push the finger press 9 back to its normal vertical position.

A short distance on both sides of the projection 26 of finger press 9 are a pair of flat circular studs 11 mounted on the frame 15 by means of screws passing through holes in the frame corresponding with threaded holes on the rear surfaces of the circular studs 11. The projection 26 engages either circular stud 11 during rotation of the finger press 9 depending on which direction the finger press 9 is moved. Therefore, the finger press 9 has limited rotatable movement.

Shown in Fig. 1 is a spring contact assembly 19 mounted vertically on the inner left surface of the frame 15 containing a plurality of springs and contacts. The spring contact assembly 19 has a pair of springs extending upward slightly farther than the remaining springs. One of the springs, spring 18 is tensioned to cause it to engage and press against bushing 33 mounted on the hook lever 31. The bottom ends of the springs are for the connecting of conductors dispersed within the frame 15 as part of the circuitry. The plurality of contacts on the springs of assembly 19 are for either making or breaking circuits for the telephone set depending on the movement of the spring 18 by the lever arm 31.

Shown on the top of the frame 15 in Fig. 1 is a dial assembly 2 mounted within a portion of a dial casing 21. The dial casing 21 has a downward hollowed pipe projection 32 which extends through a hole in the top of the frame 15. The dial casing 21 has a pair of holes which cooperate with a pair of a plurality of threaded holes in the top surface of the frame 15 for allowing the dial casing 21 to be secured by a pair of screws to the frame 15 in any one of a plurality of angular positions. The dial assembly 2 and its casing 21 are preferably mounted in the position shown in Fig. 1. The purpose of, and the construction of the dial assembly 2 is old in the art, and need not be further described. Conductors (not shown) are inserted through the pipe 32 to connect the dial assembly 2 with the other components (not shown) of the telephone set.

A full description of the locking device in cooperation with the handset will now be given.

*The handset telephone in locked position*

When the telephone handset is in the locked position as shown in Figs. 1 and 5, the transmitter 3 engages the transmitter receptacle 5, and is supported in a vertical position by the curved member 16. The receiver 4 is engaging the double curved portion of the receiver receptacle 6. The portion of the receiver receptacle 6 protruding through the slot 25 engages the bottom edge of the slot 25. The rod 17 with the hook lever 31 mounted thereon is in a rotated position whereby the bushing 31 is pushed against the tensioned spring 18 causing the springs and the contacts of the spring assembly 19 to be in an open position. The springs in the mentioned position prevent outgoing calls, but allow incoming calls in a well-known manner.

The finger press 9 and the flat spring 8 of the locking device 7 are in a straight vertical position. A portion of the rear surface of the projection 26 overlaps a portion of the opening 36 in vertical alignment. The rotatable cam 14 is in a rotated position whereby a portion of its curved outer edge engages firmly against a top portion of the transmitter 3. The flat inner edge of the projection 22 engages flush with the outer surface of the projection 26 which is overlapping the opening 36. The bottom edge of the transmitter 3 engages the leaf spring 12 causing the leaf spring 12 to be tensioned against the frame 15. This tension is caused by one end of the leaf spring 12 fastened to the flat edge 20 of the cam 14, and the other end curved and engaging the frame 15 causing the bowed center of the leaf spring 12 to be tensioned inward.

In order to remove the telephone handset, manual upward movement must be exercised and upward movement is not possible due to the cam 14 engaging the transmitter 3 and locking device 7 being in a locked position.

*Unlocking the telephone handset*

The handle 1 of the telephone handset is at a distance from the finger press 9 whereby manual grasping of the handle 1 can be followed by sideward finger pressure on the finger press 9 in either direction with the same hand if desired. Sideward pressure on the finger press 9 in either possible direction is manually applied causing the finger press 9 and the projection 26 to rotate on its bearing in a predetermined movement until the finger press 9 engages one of the flat circular studs 11. In this movement the extension 23 caused the flat spring 8 to bend and tension at its lower end. The movement of the finger press 9 also moves projection 26 out from under the flat projection 22 of cam 14 which may now move freely. While holding the finger press 9 in this position the telephone handset may now be manually lifted upward by the handle 1, causing the transmitter 3 to engage and rotate the cam 14 until the projection 22 projects into the opening 36 and remains in this position due to the pressure released on the leaf spring 12 by the transmitter 3. The released tension on the center of the spring 12 causes the spring 12 to bow outward to keep the cam 14 in the mentioned rotated position whereby the projection 22 remains in the opening 36. The finger press 9 is then released, but the tension in the spring 8 will not move it to its original vertical position due to one of the sides of the projection 26 engaging one side of the cam 14 (Fig. 2).

Upon the upward movement of the telephone handset the receiver 4 disengages the receiver receptacle 6 whereby the tensioned spring 18 pushes against the bushing 33 and the hook lever 31, causing the rod 17, the hook lever 31, and the receiver receptacle 6 to rotate until the receiver receptacle 6 engages the stop screw in the top edge of the slot 25 and the spring and contacts of the spring assembly 19 are in a closed position. When the spring assembly 19 is in the closed position, outgoing calls are possible and the dial assembly 2 is in a permissible operative position.

*Replacing the handset into a locked position*

In order to replace the handset into a locked position the handset is grasped by the handle 1 and the transmitter and receiver placed above their receptacles and are downwardly moved, whereby the transmitter 3 slides over the circular edge of the cam 14 and the transmitter 3 and receiver 4 engage their respective receptacles 5 and 6 simultaneously. The bottom edge of the transmitter 3 engages the bowed portion of the leaf spring 12 and tensions the leaf spring 12 inward causing the cam 14 to rotate, and the projection 22 moves out of the opening 36 far enough to allow the tension in the spring 8 to automatically move the finger press 9 into its normal vertical position. Upon movement of the finger press 9 to its normal position, the center surface of the projection 26 moves under the inner surface of the projection 22, and the projection 26 overlaps the opening 36 to prevent the cam 14 from rotating its projection 22 into the opening 36.

During the replacement of the handset telephone, the receiver 4 engaged the double curved end of the receiver receptacle 6 causing the receiver receptacle 6, the rod 17 and the hook lever 31 to rotate. The hook lever 31 and its bushing 33 pushes against the tensioned spring 18 causing movement of other springs in the spring contact assembly 19 to make and break contacts into an open position as shown in Fig. 1.

The telephone handset now lies in a locked position vertically as described under the heading "The handset in locked position."

It will thus be seen that I have provided an automatically operated locking means which takes effect upon the insertion of the handset elements into their receptacles and merely moving the handset downward, and that the handset is there positively locked in this position until the locking device is manually moved in either of two directions to unlock the same.

Having fully described the features and aspects of my invention, what I consider to be novel is set forth in the appended claims.

What is claimed is:

1. In a telephone substation, a handset having receiver and transmitter elements mounted thereon, a pair of receptacles on said substation each for receiving one of said elements, a rotatable cam having a bowed spring mounted thereon, a locking means, means for engaging one of said elements with one of said receptacles and said bowed spring, said cam rotated in response to engagement of said bowed spring with said element for causing automatic operation of said locking means to lock said one element into said one receptacle.

2. A mounting arrangement for a telephone handset which has elements such as a receiver and transmitter mounted thereon, comprising a pair of receptacles on each for receiving one of said elements, a rotatable cam having a bowed spring mounted thereon, a locking means, one of said elements engaged with said bowed spring upon insertion of said elements in said receptacles, said bowed spring effective for rotating said cam responsive to engagement with said element, means responsive to the rotation of said cam for causing said locking means to operate to lock said elements into said pair of receptacles.

3. In a telephone subset of the handset type, a handset including a handle and telephonic elements at opposite ends of said handle, a stationary receptacle and a pivotally mounted receptacle for receiving opposite elements of said handle, a pivotally mounted arm, a locking means including a pair of springs, a spring contact assembly having an open and a closed position, said pivotally mounted receptacle rotated and one of said pair of springs tensioned when said elements engage said receptacles, engagement of said pivotally mounted receptacle by one of said elements causing said arm to rotate and thereby cause said spring contact assembly to move to an open position, the tensioning of said one spring of said pair causing automatic operation of the other spring of said pair to thereby automatically operate said locking means into a locked position to prevent removal or displacement of said elements from said receptacles.

4. In a subset of the handset type, a handset including a handle and telephonic elements at opposite ends of said handle, a pair of retainers on said subset each for receiving one of said elements, a member rotatable in two directions, a rotatable cam having a bowed spring mounted thereon, said spring engaged and tensioned by one of said elements when said elements are engaged with said retainers, manually operative means for rotating said member in either direction to allow removal of said elements from said retainers, the removal of said elements from said pair of retainers releasing the tension from said bowed spring, the release of tension from said spring causing said cam to rotate and lock said member in the direction to which it is rotated.

5. A mounting for a telephone handset, which handset includes a handle and telephonic elements at opposite ends of said handle, comprising a pair of retainers on said mounting each for receiving one of said elements, a member rotatable in two directions, means for limiting movement in either direction of said member, a rotatable cam having a bowed spring mounted and tensioned thereon, manually operative means for rotating said member in either direction as limited by said first mentioned means and for holding it in the moved position to allow removal of said handset, means including said bowed spring operated responsive to removal of said handset from said retainers for causing said cam to rotate and lock said member in either of said limited directional positions.

6. In a subset of the handset type, a handset including a handle and telephonic elements at opposite ends of said handle, a pair of retainers on said subset each for receiving one of said elements, a stationary member having one end of a spring mounted thereon, a two sided and two direction movable pivotally mounted on an extension of said stationary member having a pair of projections, said other end of said spring inserted between said pair of projections on said two sided member, a rotatable cam having a second spring mounted thereon, said second spring tensioned by one of said elements pressing against said second spring causing said cam to press against said element, means for locking said cam, manually operative means for pivoting said two sided member on said extension of said stationary pivot member in a predetermined direction to unlock said cam and cause one of said pair of projections to tension said spring in said predetermined direction, said manually operated means causing said one element to release the tension on said second spring and to allow manual removal of said handset, whereby said manual removal of said handset will rotate said cam to lock said two sided member in said predetermined direction.

7. In a telephone substation, a handset having receiver and transmitter elements mounted thereon, a pair of retainers each for receiving one of said elements, said elements removed from said retainers by movement in one plane, a second rotatable element rotated in the same plane in which said first elements are moved, a third element rotatable in a plane at right angles to the plane in which said first and second elements are moved, and means including said second rotatable element for preventing operation of said last mentioned element by a force acting in said one plane.

8. In a telephone set, a handset having a pair of telephonic elements mounted thereon, a pair of retainers each for receiving one of said telephonic elements, said retainers arranged to permit movement of said telephonic elements therefrom in one direction only, an element movable only responsive to movement of said telephonic elements to and from said retainers, a second movable element having a normal position and movable only in a direction at right angles to said one direction, said second movable element effective in its normal position to prevent movement of said other element, means including said retainers for preventing movement of said telephonic elements responsive to a force acting at right angles to said one direction, means including said second movable element for preventing movement of said telephonic elements responsive to a force acting in said one direction, whereby said telephonic elements are movable from said retainers only in case said second movable element is moved responsive to a force acting at right angles to said one direction and said telephonic elements thereafter are moved by a force acting in said one direction.

References Cited in the file of this patent

UNITED STATES PATENTS

| | | |
|---|---|---|
| 2,163,006 | Obergfell | June 20, 1939 |
| 2,193,536 | Murdoch | Mar. 12, 1940 |
| 2,351,125 | Obergfell | June 13, 1944 |
| 2,355,464 | Obergfell | Aug. 8, 1944 |
| 2,375,681 | Obergfell | May 8, 1945 |
| 2,439,218 | Obergfell | Apr. 6, 1948 |
| 2,579,878 | Stone | Dec. 25, 1951 |